(12) United States Patent
Snapp

(10) Patent No.: US 9,102,480 B2
(45) Date of Patent: Aug. 11, 2015

(54) PALLET DISPENSER

(76) Inventor: Steven A. Snapp, Cynthiana, KY (US)

( * ) Notice: Subject to any disclaimer, the term of this patent is extended or adjusted under 35 U.S.C. 154(b) by 1208 days.

(21) Appl. No.: 12/268,085

(22) Filed: Nov. 10, 2008

(65) Prior Publication Data

US 2010/0119348 A1    May 13, 2010

(51) Int. Cl.
*B65G 57/00* (2006.01)
*B65G 59/06* (2006.01)

(52) U.S. Cl.
CPC .............. *B65G 57/00* (2013.01); *B65G 59/066* (2013.01); *Y10S 414/106* (2013.01); *Y10S 414/108* (2013.01)

(58) Field of Classification Search
USPC ............... 221/164–165, 222, 297; 414/794.9, 414/795, 795.1, 795.3, 795.4, 797.4, 797.7, 414/798, 922, 927–929, 799
See application file for complete search history.

(56) References Cited

U.S. PATENT DOCUMENTS

| | | | |
|---|---|---|---|
| 1,737,438 A * | 11/1929 | Stearns | 209/646 |
| 2,338,055 A * | 12/1943 | Pearson et al. | 414/795.1 |
| 2,433,736 A | 12/1947 | Carew | |
| 2,680,510 A * | 6/1954 | Donath | 198/418.3 |
| 2,692,691 A * | 10/1954 | Harriss et al. | 414/795.6 |
| 2,858,043 A | 10/1958 | Fenton et al. | |
| 3,078,009 A | 2/1963 | Irish | |
| 3,273,751 A | 9/1966 | Wees | |
| 3,623,618 A | 11/1971 | Shaw | |
| 3,628,693 A | 12/1971 | Moore | |
| 3,688,920 A | 9/1972 | Frish | |
| 3,693,777 A | 9/1972 | Beauchemin | |
| 3,757,971 A | 9/1973 | Frish | |
| 3,862,702 A * | 1/1975 | Johnson et al. | 221/1 |
| 3,884,366 A | 5/1975 | Leenaards | |
| 3,942,653 A * | 3/1976 | Hullhorst | 414/797.7 |
| 4,048,915 A * | 9/1977 | Martin | 101/35 |
| 4,108,319 A | 8/1978 | Kacirek et al. | |
| 4,172,686 A | 10/1979 | Shorthouse | |
| 4,547,114 A * | 10/1985 | Watrous et al. | 414/793.9 |
| 4,601,386 A | 7/1986 | Antonello | |
| 4,624,616 A | 11/1986 | Freese | |
| 4,701,092 A | 10/1987 | Reynaud et al. | |
| 4,943,207 A * | 7/1990 | Provan et al. | 414/797.7 |
| 4,950,120 A | 8/1990 | Barnes | |
| 4,960,362 A | 10/1990 | Karpisek | |
| 4,964,782 A | 10/1990 | DeCrane | |
| 4,987,721 A | 1/1991 | Turtschan | |

(Continued)

FOREIGN PATENT DOCUMENTS

| | | | | |
|---|---|---|---|---|
| JP | 58078919 A | * | 5/1983 | B65G 59/10 |
| JP | 63017741 A | * | 1/1988 | B65H 3/28 |
| SU | 1512863 A | * | 10/1989 | |

OTHER PUBLICATIONS

International Search Report and Written Opinion, regarding PCT/US2009/0601290, mailed Dec. 10, 2009.

*Primary Examiner* — Gregory Adams
(74) *Attorney, Agent, or Firm* — Wood, Herron & Evans, LLP

(57) ABSTRACT

A pallet dispenser includes a frame adapted to support a stack of pallets. The frame includes four screws with spiral flights. The pallets rest on the top edge of the spiral flights of the screws. Rotation of the screws then lowers the stack and allows the bottom pallet to drop to a support below the screws.

5 Claims, 4 Drawing Sheets

(56) References Cited

U.S. PATENT DOCUMENTS

| | | |
|---|---|---|
| 5,033,935 A | 7/1991 | Decrane |
| 5,064,093 A | 11/1991 | Davis et al. |
| 5,120,189 A | 6/1992 | Breda et al. |
| 5,480,280 A | 1/1996 | Bordon |
| 5,575,613 A | 11/1996 | Lierop |
| 5,906,472 A * | 5/1999 | Nakamura ............... 414/798.1 |
| 6,984,098 B2 * | 1/2006 | Tsukahara et al. ........ 414/794.2 |
| 7,201,555 B1 | 4/2007 | Smith |

* cited by examiner

PALLET DISPENSER

BACKGROUND OF THE INVENTION

When products are shipped on pallets, it is necessary to maintain a supply of pallets. Because pallets are relatively heavy and large, it is difficult to store and utilize the pallets.

Pallet dispensers are used to facilitate storage and use of pallets. Generally, these pallet dispensers support a stack of pallets and allow one pallet to drop from the bottom of the stack of pallets frequently to a conveyor which then takes the pallet away for use.

Pallet dispensers are generally fairly complex. Normally, these pallet dispensers will include a mechanism to support all but the bottom pallet. Another mechanism supports the bottom pallet and, when needed, allows the bottom pallet to drop. Such a mechanism can be very expensive, and relatively complex, having many different interrelated moving parts. Further, the dispensing mechanism must be able to work with a stack of very heavy pallets, weighing a total of 600 pounds or more. Thus, the weight of a stack of pallets creates issues with respect to a pallet dispenser. Further, pallets are frequently broken or irregular, making dispensing even more difficult.

SUMMARY OF THE INVENTION

The present invention is premised on the realization that a screw-type dispensing mechanism can be used in a pallet dispenser to support a stack of pallets and dispense these one at a time. The support mechanism includes a plurality of screws with spiral flights. The spiral flights of these screws support the stack of pallets and rotate to lower the pallets until the bottom pallet is released, with the remaining pallets still supported by the screws. To dispense additional pallets, the screws are, again, synchronously rotated to lower the pallets until the lowest pallet is released from the screws. These can be dispensed on a conveyer, or simply dispensed at the bottom to allow an individual to manually remove the pallet.

The objects and advantages of the present invention will be further appreciated in light of the following detailed description and drawings in which:

DETAILED DESCRIPTION

As shown in the figures, the present invention is a pallet dispenser 10, which is adapted to dispense a bottom most pallet 12 from a stack of pallets 14. The pallets are dispensed onto a chain conveyor 16.

Figure 5:
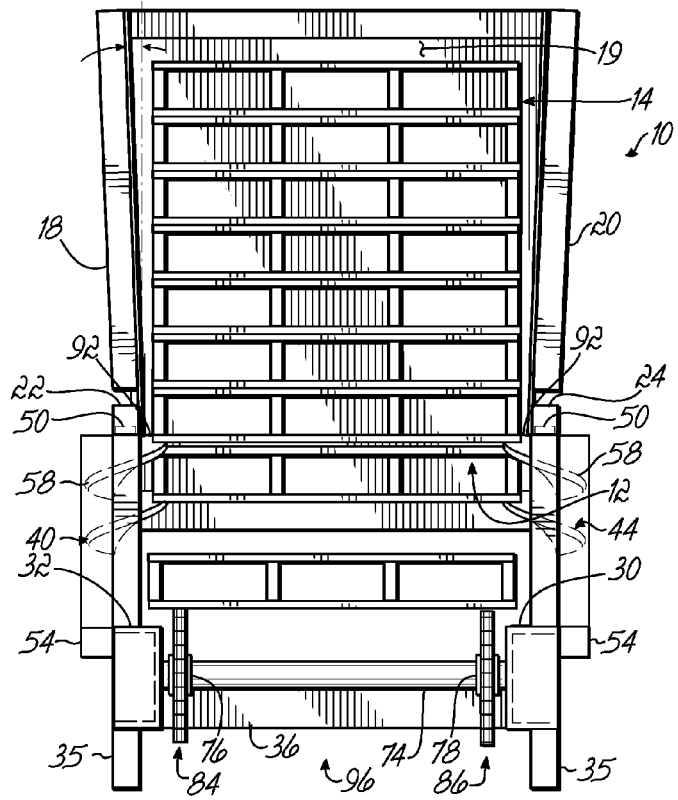
FIG. 5 is a rear plan view of the present invention.

The pallet dispenser 10 has three solid sides or walls 18,19, 20 with braces 26, and lower and upper horizontal frame members 22,24 on each side of walls 18 and 20. These walls 18,19,20 define the pallet holding zone for the pallet dispenser 10, i.e., the area taken up by the stack of pallets 14. As shown (FIG. 5) walls 18 and 20 are sloped inwardly from top to bottom to facilitate aligning the pallets.

A lower portion 28 beneath the pallet holding zone includes first and second horizontal members 30 and 32. Lateral frame members 34 and 36 extend between members 30 and 32. Horizontal frame members 30,32 act as side frame supports of conveyor 16. Members 30 and 32 are generally C-shaped beams supported by legs 35.

The pallet dispenser further includes four screws 40,42,44, 46. An upper end 48 of each screw is attached to a bushing 50, located at its upper end in horizontal members 22 and 24. The lower end 52 of each screw is attached to frame members 30 and 32 by pillow bearings 54. As shown, the screws each include a vertical shaft 56 and a spiral flight 58. The vertical shaft 56 remains outside of the pallet holding zone, while the flight 58 of each of the screws extends into the pallet holding zone. Guards 59 surround the exterior of the screws.

The flights of the screws have a leading edges 92 immediately below horizontal cross members 22 and 24. The flights extend spirally downwardly with a bottom edge 94 spaced from the conveyor 16 a distance slightly greater than the thickness of the pallets. Thus, a pallet 12 can move underneath the bottom edges 94 of the screws to be moved by conveyor 16 without engaging the screws.

At the bottom of each shaft 56 below bearings 54 is a chain sprocket 67. A continuous chain 60 connects the sprockets of all four screws. The chain is driven by motor 62, which attaches to a beveled gear member 64 attached to a drive sprocket 66. The gear and motor are attached to an adjustable mounting plate 68, which is adjustably fixed to cross member 70. The screw drive chain 60 runs through openings 61 in first and second frame members 30 and 32 around sprockets 67, and around drive sprocket 66 so that all sprockets 67 and 68 operate synchronously.

Chain conveyor 16 is located in the lower portion 28 with the upper run 71 above drive chain 60, and the lower run 72 below drive chain 60. Rear slave axel 74 of conveyor 16 runs between members 30 and 32 with the slave sprockets 76 and 78 spaced inwardly and below the pallet holding zone. Conveyor 16 in turn is driven by motor 88, which can be operated by a control unit 90.

In use, the pallet dispenser 10 is loaded by inserting the pallets 14 from the back side 96 of the dispenser 10. These pallets 14, as shown, have openings 98 for forks of a fork lift, to permit movement of the pallets. The fork openings 98 are positioned directly above the four screws 40,42,44,46 so that the bottom edge 100 of the fork openings 98 rests on the leading edge 92 of the flights of the screws.

The pallets are dispensed by rotating the screws, using the motor 62, which rotates drive sprocket 66, which in turn drives the chain 60, in turn rotating all four of the screws at the same speed. The flights of the screws are aligned so that the leading edge 92 of each screw is at the same location relative to the sides of the pallets to permit a pallet to be lowered in a level orientation.

Once the pallets are positioned in the pallet holding zone in the frame, the screws are then rotated, as shown by arrow 102, in a clockwise direction, which will lower the entire stack of pallets. The bottom pallet 12, once it extends below the bottom edges 94 of the screws, will drop onto the conveyor chains 84 and 86. The bottom pallet 12 is then removed. Continued rotation of the screws will lower additional pallets.

Figure 1:
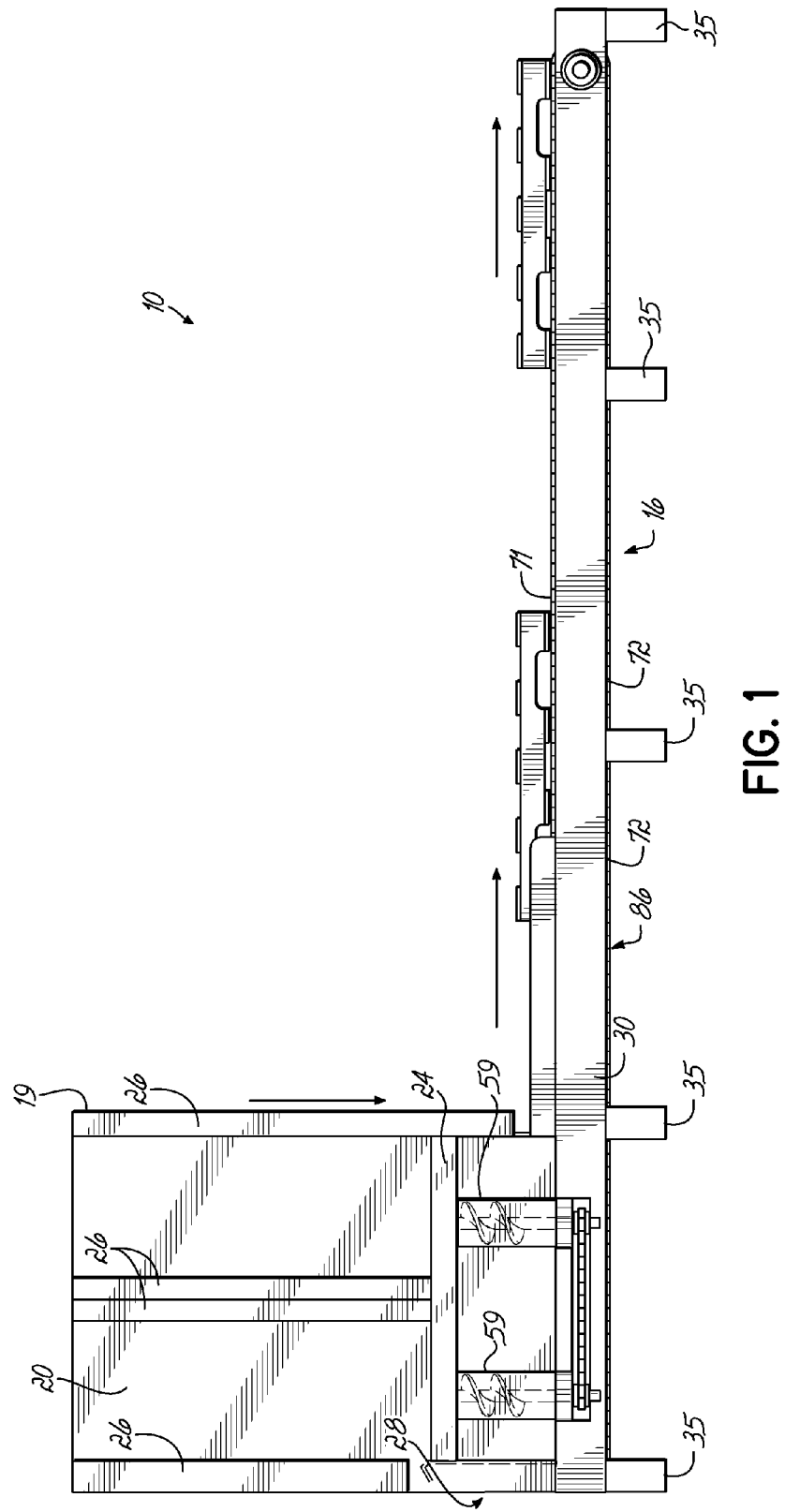
FIG. 1 is a side plan view of the present invention.
Figure 2:
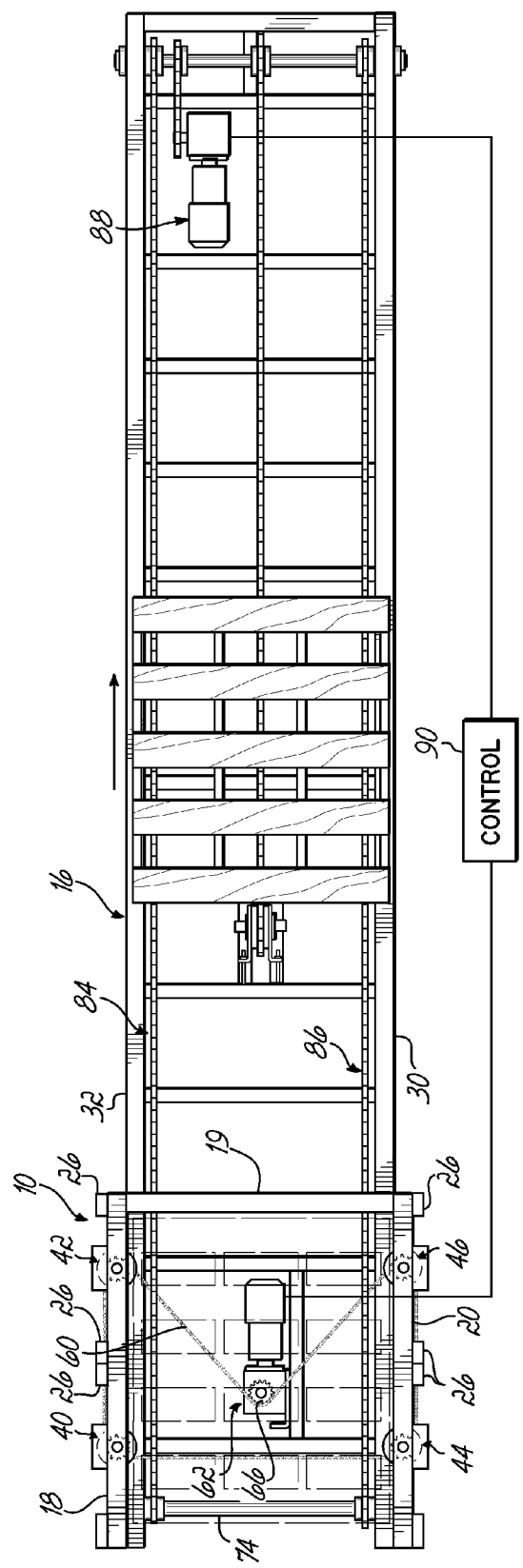
FIG. 2 is an overhead plan view of the present invention.
Figure 3:
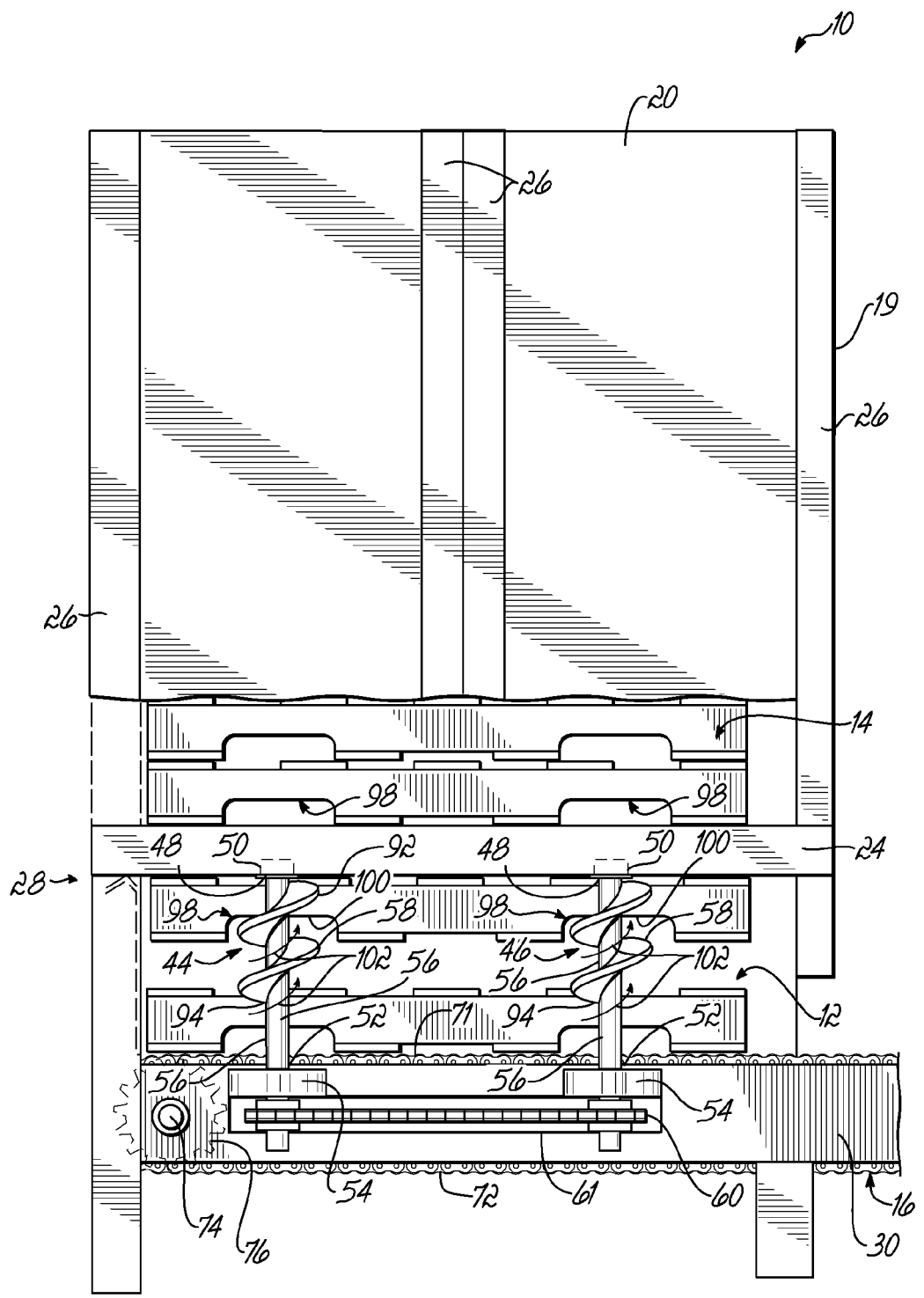
FIG. 3 is an enlarged side view of the present invention partially broken away and partially in phantom.
Figure 4:
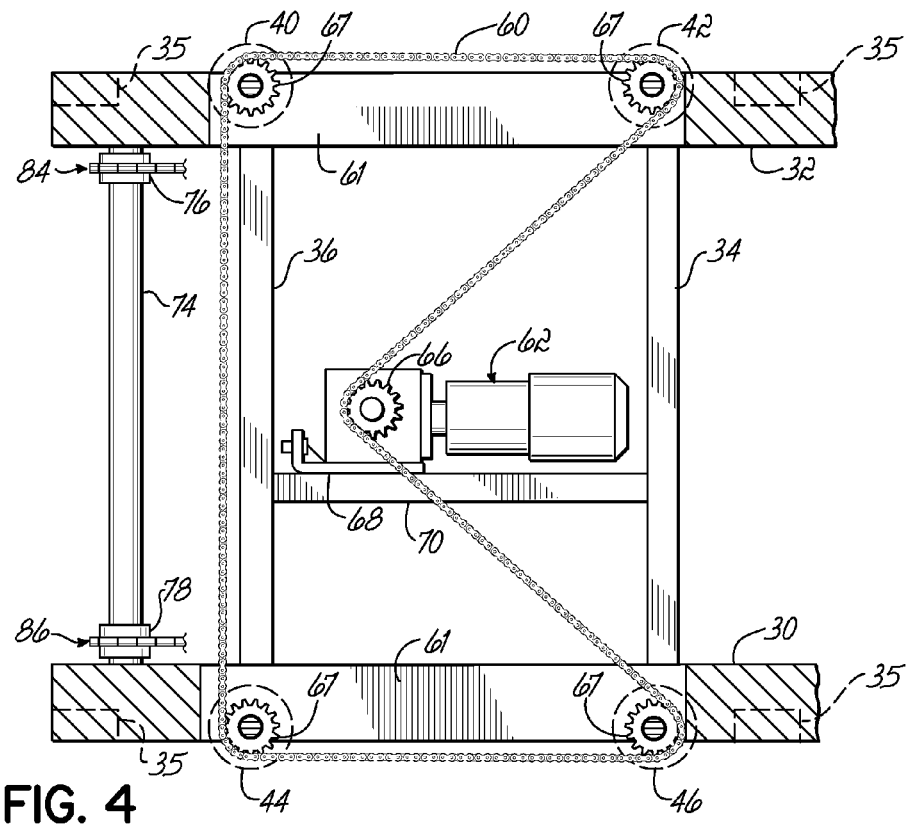
FIG. 4 is an overhead cross sectional view taken at lines 4-4 of FIG. 1.

Preferably, as shown, the pallet dispenser is used with conveyor 16. As shown in FIG. 2, the conveyor motor 88, and the motor 62 for the pallet dispenser, can both be controlled by a single control unit 90, which will cause the pallet dispenser 10 to operate synchronously with the conveyor 16. The pallet dispenser will dispense a pallet only when the conveyor is not moving. The control unit 90 can further be used to speed up the conveyor and pallet dispenser, or to slow down the conveyor and pallet dispenser, or to change their relative speeds.

The pallet dispenser, as previously described, has several advantages. The screw support system for the pallets is extremely sturdy. It does not require a second mechanism to support the stack of pallets while the lower pallet is dispensed with a separate apparatus. Because it uses a single drive chain to operate the dispenser, synchronization is inherent. Also, because the pallets are supported and dispensed on a spiral flight, irregularities in the pallet will not interfere with the operation of the pallet dispenser. The pallet dispenser will function with broken pallets or improperly manufactured pallets.

The pallet dispenser has been described in combination with a conveyor. However, it can be used without a conveyor, if preferred. For example, the pallets could be dispensed onto a slide and manually removed from the slide.

This has been a description of the present invention along with the preferred method of practicing the present invention. However, the invention itself should only be defined by the appended claims.

What is claimed is:

1. A dispenser adapted to dispense pallets having four openings along sides of the pallet for receiving the forks of a forklift truck comprising a frame defining a pallet holding zone and having one open side;
    four peripherally spaced screws, each screw having a shaft with an upper and lower end and a spirally shaped flight, said flights positioned to engage and support edges of bottom pallets of a stack of pallets within said pallet holding zone at said four openings;
    upper and lower ends of each shaft rotably connected to said frame whereby a portion of each flight extends into said pallet holding zone; and
    a drive attached to each of said screws adapted to rotate said screws to thereby lower said plurality of pallets and release one pallet at a time.

2. The apparatus claimed in claim 1 wherein said drive includes a drive chain connected to a sprocket on each of said screws.

3. The apparatus claimed in claim 1 further comprising a conveyor below bottom edges of said screws.

4. The apparatus claimed in claim 3 wherein said conveyor is a chain conveyor.

5. The apparatus claimed in claim 3 further comprising an electrical control adapted to synchronize said screws and said conveyor.

* * * * *